(12) United States Patent
Biadsy et al.

(10) Patent No.: US 9,202,461 B2
(45) Date of Patent: Dec. 1, 2015

(54) SAMPLING TRAINING DATA FOR AN AUTOMATIC SPEECH RECOGNITION SYSTEM BASED ON A BENCHMARK CLASSIFICATION DISTRIBUTION

(71) Applicant: Google Inc., Mountain View, CA (US)

(72) Inventors: Fadi Biadsy, Mountain View, CA (US); Pedro J. Moreno Mengibar, Mountain View, CA (US); Kaisuke Nakajima, Mountain View, CA (US); Daniel Martin Bikel, Mountain View, CA (US)

(73) Assignee: Google Inc., Mountain View, CA (US)

( * ) Notice: Subject to any disclaimer, the term of this patent is extended or adjusted under 35 U.S.C. 154(b) by 308 days.

(21) Appl. No.: 13/745,295

(22) Filed: Jan. 18, 2013

(65) Prior Publication Data

US 2013/0289989 A1    Oct. 31, 2013

Related U.S. Application Data

(63) Continuation of application No. 13/456,671, filed on Apr. 26, 2012, now Pat. No. 8,374,865.

(51) Int. Cl.
*G10L 15/06* (2013.01)
*G10L 15/07* (2013.01)
*G10L 15/183* (2013.01)
*G10L 17/04* (2013.01)

(52) U.S. Cl.
CPC ............. *G10L 15/063* (2013.01); *G10L 15/183* (2013.01)

(58) Field of Classification Search
CPC ......... G10L 15/06; G10L 15/07; G10L 15/14; G10L 17/04; G10L 15/063; G10L 15/183

USPC .................. 704/243, 244, 245, 246, 255, 250
See application file for complete search history.

(56) References Cited

U.S. PATENT DOCUMENTS

| | | |
|---|---|---|
| 4,741,036 A | 4/1988 | Bahl et al. |
| 5,086,385 A | 2/1992 | Launey et al. |
| 5,233,681 A | 8/1993 | Bahl et al. |
| 5,278,942 A | 1/1994 | Bahl et al. |
| 5,428,707 A | 6/1995 | Gould et al. |

(Continued)

OTHER PUBLICATIONS

Allauzen, Cyril et al., "OpenFst: A General and Efficient Weighted Finite-State Transducer Library." In Proceedings of the 12th international conference on Implementation and application of automata, 2007, pp. 11-23. Springer-Verlag.

(Continued)

*Primary Examiner* — Martin Lerner
(74) *Attorney, Agent, or Firm* — McDonnell Boehnen Hulbert & Berghoff LLP

(57) ABSTRACT

A set of benchmark text strings may be classified to provide a set of benchmark classifications. The benchmark text strings in the set may correspond to a benchmark corpus of benchmark utterances in a particular language. A benchmark classification distribution of the set of benchmark classifications may be determined. A respective classification for each text string in a corpus of text strings may also be determined. Text strings from the corpus of text strings may be sampled to form a training corpus of training text strings such that the classifications of the training text strings have a training text string classification distribution that is based on the benchmark classification distribution. The training corpus of training text strings may be used to train an automatic speech recognition (ASR) system.

17 Claims, 10 Drawing Sheets

(56) References Cited

U.S. PATENT DOCUMENTS

| | | | |
|---|---|---|---|
| 5,467,425 A * | 11/1995 | Lau et al. ............... | 704/243 |
| 5,606,644 A | 2/1997 | Chou et al. | |
| 5,625,748 A | 4/1997 | McDonough et al. | |
| 5,675,704 A | 10/1997 | Juang et al. | |
| 5,675,710 A * | 10/1997 | Lewis ..................... | 706/12 |
| 5,799,276 A | 8/1998 | Komissarchik et al. | |
| 5,864,810 A | 1/1999 | Digalakis et al. | |
| 5,895,447 A | 4/1999 | Ittycheriah et al. | |
| 6,052,682 A | 4/2000 | Miller et al. | |
| 6,064,959 A | 5/2000 | Young et al. | |
| 6,073,097 A | 6/2000 | Gould et al. | |
| 6,085,160 A | 7/2000 | D'Hoore et al. | |
| 6,112,175 A | 8/2000 | Chengalvarayan | |
| 6,151,575 A | 11/2000 | Newman et al. | |
| 6,167,377 A | 12/2000 | Gillick et al. | |
| 6,185,531 B1 | 2/2001 | Schwartz et al. | |
| 6,223,159 B1 | 4/2001 | Ishii | |
| 6,224,636 B1 | 5/2001 | Wegmann et al. | |
| 6,236,963 B1 | 5/2001 | Naito et al. | |
| 6,243,679 B1 | 6/2001 | Mohri et al. | |
| 6,253,181 B1 | 6/2001 | Junqua | |
| 6,332,122 B1 | 12/2001 | Ortega et al. | |
| 6,418,411 B1 | 7/2002 | Gong | |
| 6,456,975 B1 | 9/2002 | Chang | |
| 6,519,562 B1 | 2/2003 | Phillips et al. | |
| 6,567,776 B1 | 5/2003 | Chang et al. | |
| 6,804,647 B1 | 10/2004 | Heck et al. | |
| 6,915,259 B2 | 7/2005 | Rigazio et al. | |
| 6,941,264 B2 | 9/2005 | Konopka et al. | |
| 6,999,926 B2 | 2/2006 | Yuk et al. | |
| 7,076,428 B2 | 7/2006 | Anastasakos et al. | |
| 7,092,888 B1 | 8/2006 | McCarthy et al. | |
| 7,236,931 B2 * | 6/2007 | He et al. ............... | 704/251 |
| 7,269,555 B2 | 9/2007 | Yuk et al. | |
| 7,328,154 B2 | 2/2008 | Mutel et al. | |
| 7,337,115 B2 | 2/2008 | Liu et al. | |
| 7,415,409 B2 * | 8/2008 | Simoneau et al. .......... | 704/243 |
| 7,499,857 B2 | 3/2009 | Gunawardana | |
| 7,668,718 B2 | 2/2010 | Kahn et al. | |
| 7,725,316 B2 | 5/2010 | Chengalvarayan et al. | |
| 7,729,909 B2 | 6/2010 | Rigazio et al. | |
| 7,756,708 B2 | 7/2010 | Cohen et al. | |
| 7,822,603 B1 | 10/2010 | Parthasarathy et al. | |
| 7,822,605 B2 | 10/2010 | Zigel et al. | |
| 7,827,123 B1 * | 11/2010 | Yagnik ..................... | 706/12 |
| 7,835,911 B2 * | 11/2010 | Balchandran et al. ........ | 704/257 |
| 7,912,447 B2 | 3/2011 | Bennett, III et al. | |
| 8,014,591 B2 | 9/2011 | Baker | |
| 8,041,566 B2 * | 10/2011 | Peters et al. .............. | 704/236 |
| 8,050,908 B2 | 11/2011 | Mohri et al. | |
| 8,082,147 B2 | 12/2011 | Parthasarathy et al. | |
| 8,095,356 B2 | 1/2012 | Kempe et al. | |
| 8,260,615 B1 | 9/2012 | Nakajima et al. | |
| 8,296,138 B2 | 10/2012 | Parthasarathy et al. | |
| 8,306,819 B2 | 11/2012 | Liu et al. | |
| 8,346,551 B2 | 1/2013 | Herbig et al. | |
| 8,374,865 B1 * | 2/2013 | Biadsy et al. ............ | 704/243 |
| 8,473,300 B1 * | 6/2013 | Moreno Mengibar et al. ............ | 704/244 |
| 8,606,575 B1 * | 12/2013 | Witt-ehsani ............... | 704/235 |
| 8,655,647 B2 * | 2/2014 | Moore ..................... | 704/9 |
| 8,818,808 B2 * | 8/2014 | Hakkani-Tur et al. ........ | 704/243 |
| 2002/0049600 A1 | 4/2002 | L'Esperance et al. | |
| 2002/0055844 A1 | 5/2002 | L'Esperance et al. | |
| 2002/0087987 A1 | 7/2002 | Dudkiewicz et al. | |
| 2003/0050780 A1 | 3/2003 | Rigazio et al. | |
| 2004/0059697 A1 * | 3/2004 | Forman .................... | 706/46 |
| 2004/0088162 A1 | 5/2004 | He et al. | |
| 2004/0093210 A1 | 5/2004 | Toyama | |
| 2004/0107099 A1 | 6/2004 | Charlet | |
| 2004/0230424 A1 | 11/2004 | Gunawardana | |
| 2004/0249628 A1 | 12/2004 | Chelba et al. | |
| 2005/0028208 A1 | 2/2005 | Ellis et al. | |
| 2005/0044053 A1 | 2/2005 | Moreno et al. | |
| 2005/0131688 A1 | 6/2005 | Goronzy et al. | |
| 2006/0009972 A1 | 1/2006 | Yuk et al. | |
| 2006/0069678 A1 * | 3/2006 | Chou et al. ............. | 707/5 |
| 2006/0074664 A1 | 4/2006 | Lam et al. | |
| 2006/0132326 A1 | 6/2006 | Fang et al. | |
| 2007/0005355 A1 | 1/2007 | Tian et al. | |
| 2007/0129943 A1 | 6/2007 | Lei et al. | |
| 2008/0010057 A1 | 1/2008 | Chengalvarayan et al. | |
| 2008/0091423 A1 | 4/2008 | Roy et al. | |
| 2008/0120112 A1 | 5/2008 | Jordan et al. | |
| 2008/0177545 A1 | 7/2008 | Li et al. | |
| 2008/0195389 A1 | 8/2008 | Zhang et al. | |
| 2008/0215311 A1 | 9/2008 | Chelba et al. | |
| 2008/0270449 A1 | 10/2008 | Gossweiler et al. | |
| 2008/0312926 A1 | 12/2008 | Vair et al. | |
| 2009/0024390 A1 | 1/2009 | Deshmukh et al. | |
| 2009/0112592 A1 | 4/2009 | Candelore | |
| 2009/0171870 A1 * | 7/2009 | Dasgupta et al. ............. | 706/12 |
| 2010/0057453 A1 | 3/2010 | Valsan | |
| 2010/0076765 A1 | 3/2010 | Zweig et al. | |
| 2010/0114572 A1 | 5/2010 | Tani et al. | |
| 2010/0138222 A1 | 6/2010 | Herbig et al. | |
| 2010/0169094 A1 | 7/2010 | Akamine et al. | |
| 2010/0228548 A1 | 9/2010 | Liu et al. | |
| 2010/0296654 A1 | 11/2010 | Wilson et al. | |
| 2010/0312557 A1 | 12/2010 | Strom et al. | |
| 2010/0332235 A1 | 12/2010 | David | |
| 2011/0029307 A1 | 2/2011 | Parthasarathy et al. | |
| 2011/0067059 A1 | 3/2011 | Johnston et al. | |
| 2011/0099013 A1 * | 4/2011 | Melamed et al. ............ | 704/255 |
| 2011/0134320 A1 | 6/2011 | Daly | |
| 2011/0144973 A1 * | 6/2011 | Bocchieri et al. .............. | 704/2 |
| 2011/0213613 A1 | 9/2011 | Cohen et al. | |
| 2011/0313775 A1 | 12/2011 | Laligand et al. | |
| 2012/0022869 A1 * | 1/2012 | Lloyd et al. ............... | 704/244 |
| 2012/0072212 A1 | 3/2012 | Parthasarathy et al. | |
| 2012/0078621 A1 | 3/2012 | Kanevsky et al. | |
| 2012/0109651 A1 | 5/2012 | Chen | |
| 2012/0150539 A1 | 6/2012 | Jeon et al. | |
| 2012/0314941 A1 * | 12/2012 | Kannan et al. ............. | 382/161 |

OTHER PUBLICATIONS

Allauzen, Cyril et al., "OpenFst: A General and Efficient Weighted Finite-State Transducer Library," http://www.stringology.org/event/CIAA2007/pres/Tue2/Riley.pdf, Jul. 17, 2007, pp. 1-36.

Bahl et al., "A Maximum Likelihood Approach to Continuous Speech Recognition," IEEE Transactions on Pattern Analysis and Machine Intelligence, Mar. 1983, pp. 179-190, vol. PAMI-5, No. 2.

Breslin, C. et al., "Prior Information for Rapid Speaker Adaptation," In Proceedings of Interspeech, pp. 1644-1647 (2010).

Ferras, Marc et al., "Constrained MLLR for Speaker Recognition," IEEE International Conference on Acoustics, Speech and Signal Processing (ICASSP 2007), vol. 4, pp. IV-53 to IV-56 (2007).

Fong et al., "Detecting Word Substitutions in Text," IEEE Transactions on Knowledge and Data Engineering, Aug. 2008, vol. 20, No. 8, pp. 1067-1076.

Fontanari, Jose F., "Minimal models for text production and Zipfs law," Integration of Knowledge Intensive Multi-Agent Systems, KIMAS 2005, pp. 297-300.

Gales, M.J.F., "Maximum Likelihood Linear Transformations for HMM-based Speech Recognition," CUED/F-INFENG/TR 291, Tech. Rep., Cambridge University Engineering Department, pp. 1-19 (May 1997).

Goel et al., "Minimum Bayes-Risk Automatic Speech Recognition." Computer Speech & Language, 2000, pp. 115-135, vol. 14, No. 2.

Hasegawa-Johnson, Mark, Lecture 2: Acoustic Features, Acoustic Model Training, and Unix Scripting, pp. 1-16 (Jan. 8, 2009).

Joachims et al., "SVMstruct-Support Vector Machine for Complex Outputs," Cornell University, Department of Computer Science, Aug. 14, 2008, pp. 1-6.

Leggetter, C.J. et al., "Maximum likelihood linear regression for speaker adaptation of continuous density hidden Markov models," Computer Speech and Language, vol. 9, pp. 171-185 (1995).

Lei et al., "Robust Feature Space Adaptation for Telephony Speech Recognition." In Proc. ICSLP, pp. 773-776 (2006).

(56) References Cited

OTHER PUBLICATIONS

Li, Yongxin et al., "Incremental On-Line Feature Space MLLR Adaptation for Telephony Speech Recognition." In International Conference on Spoken Language Processing, Denver, pp. 1417-1420 (2002).

Ljolje et al. "Efficient general lattice generation and rescoring." Sixth European Conference on Speech Communication and Technology, 1999, pp. 1-4.

Mangu et al., "Finding consensus in speech recognition: word error minimization and other applications of confusion networks," Computer Speech & Language, 2000, pp. 373-400, vol. 14, No. 4.

Matsoukas et al., "Improved Speaker Adaptation Using Speaker Dependent Feature Projections," IEEE Workshop on Automatic Speech Recognition and Understanding (ASRU'03), pp. 273-278 (2003).

Mohri et al., "The Design Principles of a Weighted Finite-State Transducer Library," Theoretical Computer Science, 2000, pp. 17-32, vol. 231, No. 1.

Mohri et al., "Weighted Finite-State Transducers in Speech Recognition," Computer Speech & Language, 2002, pp. 69-88, vol. 16, No. 1.

Mohri, Mehryar. "Weighted Finite-State Transducer Algorithms. An Overview." Studies in Fuzziness and Soft Computing, 2004, pp. 551-564, vol. 148.

Mohri, M., "Edit-Distance of Weighted Automata: General Definitions and Algorithms," International Journal of Foundations of Computer Science, 2003, pp. 957-982, vol. 14, No. 06.

Mohri et al., "A Rational Design for a Weighted Finite-State Transducer Library." Automata Implementation, 1998, pp. 144-158.

OpenFst Examples, http://www.openfst.org/twiki/bin/view/FST/FstExamples, pp. 1-9.

Post et al., "Weight pushing and binarization for fixed-grammar parsing," In Proceedings of the 11th International Conference on Parsing Technologies Association for Computational Linguistics, 2009, pp. 89-98.

Reynolds, Douglas, "Gaussian mixture models." Encyclopedia of Biometric Recognition, pp. 12-17 (2008).

Reynolds et al., "Speaker Verification Using Adapted Gaussian Mixture Models," Digital Signal Processing, vol. 10, pp. 19-41 (2000).

Reynolds et al., "Robust Text-Independent Speaker Identification Using Gaussian Mixture Speaker Models," IEEE Transactions on Speech and Audio Processing, vol. 3, No. 1, pp. 72-83 (Jan. 1995).

Saon, George, et al., "Eliminating Inter-Speaker Variability Prior to Discriminant Transforms." IEEE Workshop on Automatic Speech Recognition and Understanding (ASRU'01) pp. 73-76 (2001).

Saon, George, et al., "Linear feature space projections for speaker adaptation." 2001 IEEE International Conference on Acoustics, Speech, and Signal Processing (ICASSP'01) vol. 1, pp. 325-328, (2001).

Schluter, R. et al., "Bayes Risk Minimization Using Metric Loss Functions," In Proceedings of the European Conference on Speech Communication and Technology, Interspeech, 2005, pp. 1449-1452.

Stolcke, Andreas et al., "Explicit word error minimization in N-best list rescoring." In Proc. Eurospeech, 1997, pp. 163-166, vol. 1.

Tran, Dat et al., "Fuzzy Gaussian Mixture Models for Speaker Recognition," In Proceedings of the International Conference on Spoken Language Processing, pp. 759-762 (1998).

Tsochantaridis et al., "Large Margin Methods for Structured and Interdependent Output Variables," Journal of Machine Learning Research, 2005, pp. 1453-1484, vol. 6.

Varadarajan, Balakrishnan et al., "Quick FMLLR for Speaker Adaptation in Speech Recognition." IEEE International Conference on Acoustics, Speech and Signal Processing, 2008. ICASSP 2008, Mar. 31, 2008-Apr. 4, 2008, pp. 4297-4300.

Velivelli et al., "Automatic Video Annotation by Mining Speech Transcripts," Proceedings of the 2006 Conference on Computer Vision and Pattern Recognition Workshop, 2006, pp. 1-8.

Woodland, Phil C. "Speaker Adaptation for Continuous Density HMMs: A Review." In ISCA Tutorial and Research Workshop (ITRW) on Adaptation Methods for Speech Recognition, pp. 11-19 (Aug. 29-30, 2001).

Xu, Haihua et al., "Minimum Bayes Risk Decoding and System Combination Based on a Recursion for Edit Distance." Computer Speech & Language, 2011, pp. 802-828, vol. 25, No. 4.

Zhang, Shilei et al., "Model Dimensionality Selection in Bilinear Transformation for Feature Space MLLR Rapid Speaker Adaptation," 2012 IEEE International Conference on Acoustics, Speech and Signal Processing (ICASSP), Mar. 25-30, 2012, pp. 4353-4356.

Notice of Allowance for U.S. Appl. No. 13/456,671 mailed Oct. 9, 2012, 8 pages.

Office Action for U.S. Appl. No. 13/461,093 mailed Aug. 2, 2012, 18 pages.

Office Action for U.S. Appl. No. 13/653,804 mailed Apr. 2, 2013, 35 pages.

Office Action for U.S. Appl. No. 13/653,792 mailed Mar. 27, 2013, 26 pages.

Office Action for U.S. Appl. No. 13/666,223 mailed Apr. 8, 2013, 7 pages.

Final Office Action for U.S. Appl. No. 13/461,093 mailed Jan. 14, 2013, 25 pages.

* cited by examiner

SAMPLING TRAINING DATA FOR AN AUTOMATIC SPEECH RECOGNITION SYSTEM BASED ON A BENCHMARK CLASSIFICATION DISTRIBUTION

CROSS-REFERENCE TO RELATED APPLICATION

The present application claims priority to U.S. patent application Ser. No. 13/456,671, filed on Apr. 26, 2012, now U.S. Pat. No. 8,374,865, issued Feb. 12, 2013 and herein incorporated by reference in its entirety.

BACKGROUND

A goal of automatic speech recognition (ASR) technology is to map a particular audio utterance to an accurate textual representation of that utterance. For instance, ASR performed on the utterance "cat and dog" would ideally be mapped to the text string "cat and dog," rather than the nonsensical text string "skate and hog," or the sensible but inaccurate text string "Kate and Doug." An ASR system can be trained with a language's syntax as appearing in a large corpus of training text strings. However, ASR system performance may vary based on the characteristics of this corpus.

SUMMARY

In a first example embodiment, a set of benchmark text strings may be classified to provide a set of benchmark classifications. The benchmark text strings may correspond to a benchmark corpus of benchmark utterances in a particular language. A benchmark classification distribution of the set of benchmark classifications may be determined. A respective classification for each text string in a corpus of text strings may also be determined. Text strings from the corpus of text strings may be sampled to form a training corpus of training text strings such that the classifications of the training text strings have a training text string classification distribution that is based on the benchmark classification distribution. The training corpus of training text strings may be used to train an ASR system.

A second example embodiment may include a non-transitory computer-readable medium, having stored thereon program instructions that, upon execution by a computing device, cause the computing device to perform operations in accordance with the first example embodiment.

A third example embodiment may include a computing system comprising at least one processor, data storage, and program instructions in the data storage that, upon execution by the at least one processor, cause the computing system to operate in accordance with the first example embodiment.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

1. Overview

Figure 1:
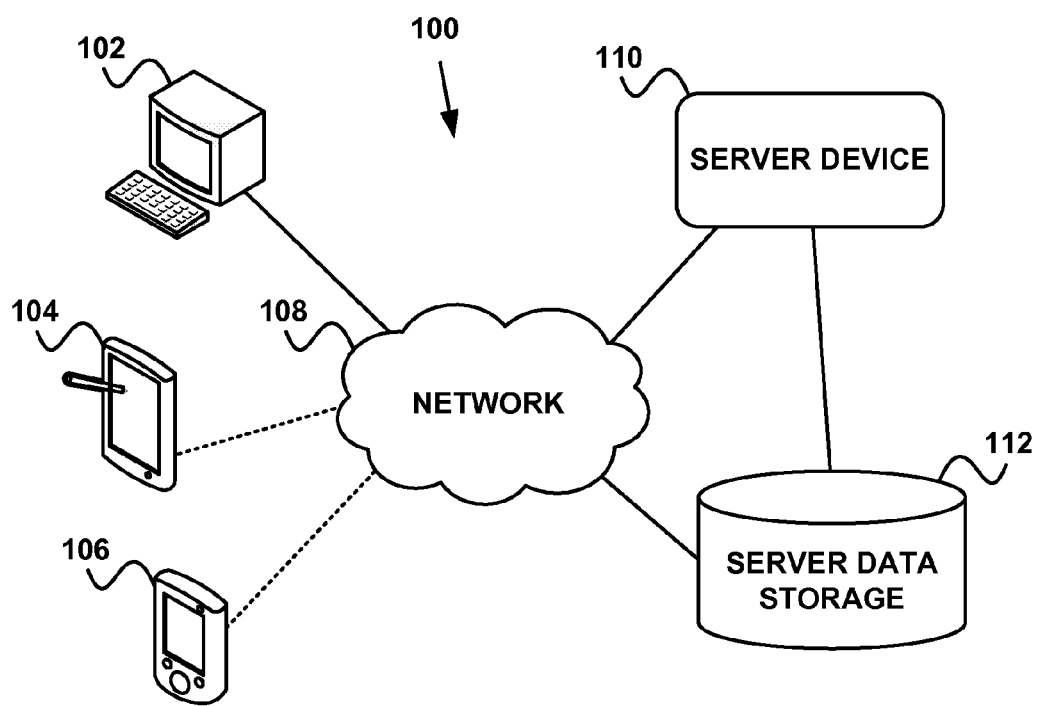
FIG. 1 depicts a distributed computing architecture, in accordance with an example embodiment.

A corpus of utterance-to-text-string mappings may be used to train an ASR system. In particular, these mappings may contain a quantity of audio utterances (e.g., audio files of human speech). In some implementations, there may be thousands, tens of thousands, hundreds of thousands, tens of millions, or more audio utterances. The mappings may associate each audio utterance with a manually-transcribed and/or automatically-transcribed text string of that audio utterance. Possibly using various mathematical and/or machine learning techniques, the ASR system may use the corpus to develop probabilistic mappings between sounds and phonemes, phoneme patterns and words, and/or words and word frequencies. These probabilistic mappings may be represented as a search graph.

In some embodiments, the ASR system may be trained offline, prior to becoming operational. For example, training an ASR system with a large corpus may take several hours or days. On the other hand, the ASR system may instead be trained online. In the latter case, the ASR system may be dynamically updated while operating.

An ASR system may include a language model. Briefly, as language models will be described in more detail in later sections, a language model may represent the conditional probability of a particular word appearing in a phrase given the pattern of the n−1 previous words in the phrase. For example, given a phrase containing the pattern "in the," a language model might assign a relatively high probability to the next word being "house," and a relatively low probability to the next word being "louse."

ASR systems may use a language model to improve speech recognition accuracy by taking phrase-level and sentence-level context into account. Thus, language models may be developed based on a large corpus of phrases and sentences in a particular language. For instance, a language model can be trained with a database of millions of phrases and/or sentences derived from general usage of the particular language.

However, the performance of the language model may vary dramatically based on the characteristics of the phrases and/or sentences used to train the language model. Thus, a language model trained with phrases and/or sentences derived from World-Wide Web (WWW) documents may perform poorly when used by an ASR system to recognize utterances from voice instant messaging applications. Similarly, a language model trained with phrases and/or sentences derived from voice instant messaging applications may perform poorly when used by an ASR system to recognize utterances from news broadcasts.

Consequently, it may be beneficial to train the language model of an ASR system with phrases and/or sentences related to the language domain in which the ASR system is expected to be used. One way of doing so is to sample training data from a corpus of phrases and/or sentences such that the sampled training data exhibits characteristics that match, or are similar to, those of speech from one or more target users. These characteristics may include, but are not limited to, topics, style (e.g., formal or spontaneous), and dialect of the target users' speech.

For example, a language model for recognizing voice instant messaging can be developed by gathering a benchmark set of utterances made by users of voice instant messaging applications. Each of these benchmark utterances may be transcribed into a corresponding benchmark text string. Then, a topic classifier may be applied to these benchmark text strings.

In some embodiments, the topic classifier may estimate, or otherwise determine, one or more topics discussed in each benchmark text string. Examples of topics include news, sports, weather, economics, politics, technology, science, business, entertainment, health, general conversation, etc.

Once the text strings are classified, a benchmark topic distribution of the benchmark text strings may be determined. For instance, 50% of the benchmark text strings may be general conversation, 20% news, 10% sports, and so on. The same or a similar topic classifier may be used to determine the topics of a large corpus of text strings. Then, training data can be sampled from the large corpus of text strings such that the topic distribution of the training data approximates the benchmark topic distribution. Thus, the training data may be used to train the language model of an ASR system for voice instant messaging applications. In this way, the ASR system is trained so that it is more likely to be able to accurately recognize utterances made to voice instant messaging applications.

The above processes, and example embodiments thereof, will be described in detail in Sections 5 and 6. However, in order to further embody ASR system implementations, the next three sections describe, respectively, example computing systems and devices that may support ASR systems, an overview ASR systems training, and an overview of ASR system operation.

2. Example Communication System and Device Architecture for Supporting Automatic Speech Recognition ASR systems have been deployed in various environments. Some ASR systems are just a single machine (e.g., a personal computer) into which a user speaks utterances and the ASR system transcribes the utterances into one or more text strings. Other ASR systems are client/server based, in which the user speaks an utterance into a client device, and the client device may encode the utterance and transmit it to a server device. Then, the server device performs speech recognition on the encoded utterance and transmits one or more text string mappings to the client device for presentation to the user. Particularly, on wireless communication devices such as mobile phones, client/server based ASR can be supported by Internet search applications, geo-location and mapping applications, text messaging and instant messaging applications, and by virtually any third-party application as well. The server component of an ASR system may include just a single server device, or may be distributed in various ways across a number of server devices.

The methods, devices, and systems described herein can be implemented using client devices and/or so-called "cloud-based" server devices. Under various aspects of this paradigm, client devices, such as mobile phones and tablet computers, may offload some processing and storage responsibilities to remote server devices. At least some of the time, these client services are able to communicate, via a network such as the Internet, with the server devices. As a result, applications that operate on the client devices may also have a persistent, server-based component. Nonetheless, it should be noted that at least some of the methods, processes, and techniques disclosed herein may be able to operate entirely on a client device or a server device.

Furthermore, the "server devices" described herein may not necessarily be associated with a client/server architecture, and therefore may be interchangeably referred to as "computing devices." Similarly, the "client devices" described herein also may not necessarily be associated with a client/server architecture, and therefore may be interchangeably referred to as "user devices."

This section describes general system and device architectures for such client devices and server devices. However, the methods, devices, and systems presented in the subsequent sections may operate under different paradigms as well. Thus, the embodiments of this section are merely examples of how these methods, devices, and systems can be enabled.

A. Communication System

FIG. 1 is a simplified block diagram of a communication system 100, in which various embodiments described herein can be employed. Communication system 100 includes client devices 102, 104, and 106, which represent a desktop personal computer (PC), a tablet computer, and a mobile phone, respectively. Each of these client devices may be able to communicate with other devices via a network 108 through the use of wireline connections (designated by solid lines) and/or wireless connections (designated by dashed lines).

Network 108 may be, for example, the Internet, or some other form of public or private Internet Protocol (IP) network. Thus, client devices 102, 104, and 106 may communicate using packet-switching technologies. Nonetheless, network 108 may also incorporate at least some circuit-switching technologies, and client devices 102, 104, and 106 may communicate via circuit switching alternatively or in addition to packet switching.

A server device 110 may also communicate via network 108. Particularly, server device 110 may communicate with client devices 102, 104, and 106 according to one or more network protocols and/or application-level protocols to facilitate the use of network-based or cloud-based computing on these client devices. Server device 110 may include integrated data storage (e.g., memory, disk drives, etc.) and may also be able to access a separate server data storage 112. Communication between server device 110 and server data storage 112 may be direct, via network 108, or both direct and via network 108 as illustrated in FIG. 1. Server data storage 112 may store application data that is used to facilitate the operations of applications performed by client devices 102, 104, and 106 and server device 110.

Although only three client devices, one server device, and one server data storage are shown in FIG. 1, communication system 100 may include any number of each of these components. For instance, communication system 100 may comprise millions of client devices, thousands of server devices and/or thousands of server data storages. Furthermore, client devices may take on forms other than those in FIG. 1.

B. Server Device

Figure 2A:
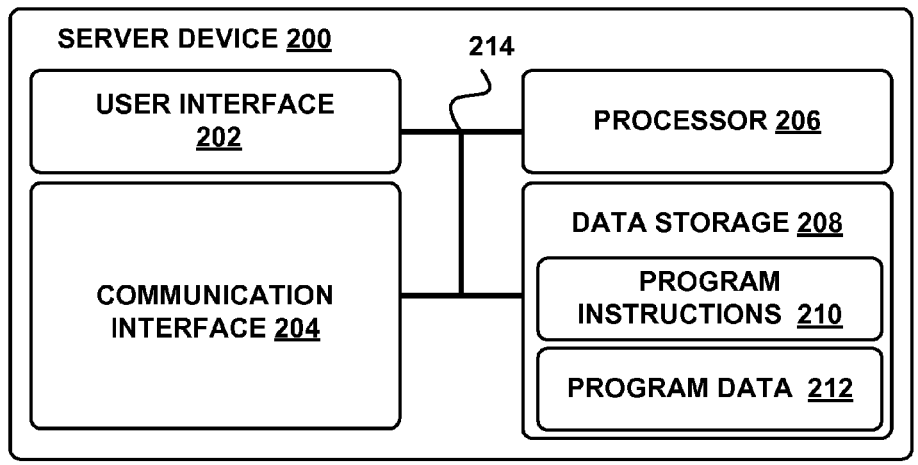
FIG. 2A is a block diagram of a server device, in accordance with an example embodiment.

FIG. 2A is a block diagram of a server device in accordance with an example embodiment. In particular, server device 200 shown in FIG. 2A can be configured to perform one or more functions of server device 110 and/or server data storage 112. Server device 200 may include a user interface 202, a communication interface 204, processor 206, and data storage 208, all of which may be linked together via a system bus, network, or other connection mechanism 214.

User interface 202 may comprise user input devices such as a keyboard, a keypad, a touch screen, a computer mouse, a track ball, a joystick, and/or other similar devices, now known or later developed. User interface 202 may also comprise user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. Additionally, user interface 202 may be configured to generate audible output(s), via a speaker, speaker jack, audio output port, audio output device, earphones, and/or other similar devices, now known or later developed. In some embodiments, user interface 202 may include software, circuitry, or another form of logic that can transmit data to and/or receive data from external user input/output devices.

Communication interface 204 may include one or more wireless interfaces and/or wireline interfaces that are configurable to communicate via a network, such as network 108 shown in FIG. 1. The wireless interfaces, if present, may include one or more wireless transceivers, such as a BLUETOOTH® transceiver, a Wifi transceiver perhaps operating in accordance with an IEEE 802.11 standard (e.g., 802.11b, 802.11g, 802.11n), a WiMAX transceiver perhaps operating in accordance with an IEEE 802.16 standard, a Long-Term Evolution (LTE) transceiver perhaps operating in accordance with a 3rd Generation Partnership Project (3GPP) standard, and/or other types of wireless transceivers configurable to communicate via local-area or wide-area wireless networks. The wireline interfaces, if present, may include one or more wireline transceivers, such as an Ethernet transceiver, a Universal Serial Bus (USB) transceiver, or similar transceiver configurable to communicate via a twisted pair wire, a coaxial cable, a fiber-optic link or other physical connection to a wireline device or network.

Processor 206 may include one or more general purpose processors (e.g., microprocessors) and/or one or more special purpose processors (e.g., digital signal processors (DSPs), graphical processing units (GPUs), floating point processing units (FPUs), network processors, or application specific integrated circuits (ASICs)). Processor 206 may be configured to execute computer-readable program instructions 210 that are contained in data storage 208, and/or other instructions, to carry out various functions described herein.

Thus, data storage 208 may include one or more non-transitory computer-readable storage media that can be read or accessed by processor 206. The one or more computer-readable storage media may include volatile and/or non-volatile storage components, such as optical, magnetic, organic or other memory or disc storage, which can be integrated in whole or in part with processor 206. In some embodiments, data storage 208 may be implemented using a single physical device (e.g., one optical, magnetic, organic or other memory or disc storage unit), while in other embodiments, data storage 208 may be implemented using two or more physical devices.

Data storage 208 may also include program data 212 that can be used by processor 206 to carry out functions described herein. In some embodiments, data storage 208 may include, or have access to, additional data storage components or devices (e.g., cluster data storages described below).

C. Server Clusters

Server device 110 and server data storage device 112 may store applications and application data at one or more places accessible via network 108. These places may be data centers containing numerous servers and storage devices. The exact physical location, connectivity, and configuration of server device 110 and server data storage device 112 may be unknown and/or unimportant to client devices. Accordingly, server device 110 and server data storage device 112 may be referred to as "cloud-based" devices that are housed at various remote locations.

One possible advantage of such "cloud-based" computing is to offload processing and data storage from client devices, thereby simplifying the design and requirements of these client devices.

In some embodiments, server device 110 and server data storage device 112 may be a single computing device residing in a single data center. In other embodiments, server device 110 and server data storage device 112 may include multiple computing devices in a data center, or even multiple computing devices in multiple data centers, where the data centers are located in diverse geographic locations. For example, FIG. 1 depicts each of server device 110 and server data storage device 112 potentially residing in a different physical location.

Figure 2B:
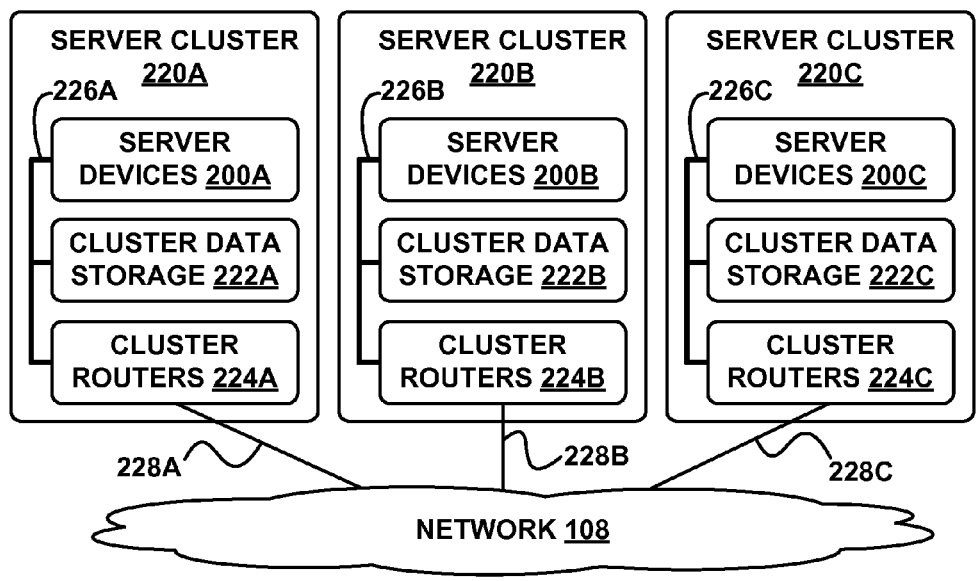
FIG. 2B depicts a cloud-based server system, in accordance with an example embodiment.

FIG. 2B depicts a cloud-based server cluster in accordance with an example embodiment. In FIG. 2B, functions of server device 110 and server data storage device 112 may be distributed among three server clusters 220A, 220B, and 220C. Server cluster 220A may include one or more server devices 200A, cluster data storage 222A, and cluster routers 224A connected by a local cluster network 226A. Similarly, server cluster 220B may include one or more server devices 200B, cluster data storage 222B, and cluster routers 224B connected by a local cluster network 226B. Likewise, server cluster 220C may include one or more server devices 200C, cluster data storage 222C, and cluster routers 224C connected by a local cluster network 226C. Server clusters 220A, 220B, and 220C may communicate with network 108 via communication links 228A, 228B, and 228C, respectively.

In some embodiments, each of the server clusters 220A, 220B, and 220C may have an equal number of server devices, an equal number of cluster data storages, and an equal number of cluster routers. In other embodiments, however, some or all of the server clusters 220A, 220B, and 220C may have different numbers of server devices, different numbers of cluster data storages, and/or different numbers of cluster routers. The number of server devices, cluster data storages, and cluster routers in each server cluster may depend on the computing task(s) and/or applications assigned to each server cluster.

In the server cluster 220A, for example, server devices 200A can be configured to perform various computing tasks of server device 110. In one embodiment, these computing tasks can be distributed among one or more of server devices 200A. Server devices 200B and 200C in server clusters 220B and 220C may be configured the same or similarly to server devices 200A in server cluster 220A. On the other hand, in some embodiments, server devices 200A, 200B, and 200C each may be configured to perform different functions. For example, server devices 200A may be configured to perform one or more functions of server device 110, and server devices 200B and server device 200C may be configured to perform functions of one or more other server devices. Similarly, the functions of server data storage device 112 can be dedicated to a single server cluster, or spread across multiple server clusters.

Cluster data storages 222A, 222B, and 222C of the server clusters 220A, 220B, and 220C, respectively, may be data storage arrays that include disk array controllers configured to manage read and write access to groups of hard disk drives. The disk array controllers, alone or in conjunction with their respective server devices, may also be configured to manage backup or redundant copies of the data stored in cluster data storages to protect against disk drive failures or other types of failures that prevent one or more server devices from accessing one or more cluster data storages.

Similar to the manner in which the functions of server device 110 and server data storage device 112 can be distributed across server clusters 220A, 220B, and 220C, various active portions and/or backup/redundant portions of these components can be distributed across cluster data storages 222A, 222B, and 222C. For example, some cluster data storages 222A, 222B, and 222C may be configured to store backup versions of data stored in other cluster data storages 222A, 222B, and 222C.

Cluster routers 224A, 224B, and 224C in server clusters 220A, 220B, and 220C, respectively, may include networking equipment configured to provide internal and external communications for the server clusters. For example, cluster routers 224A in server cluster 220A may include one or more packet-switching and/or routing devices configured to provide (i) network communications between server devices 200A and cluster data storage 222A via cluster network 226A, and/or (ii) network communications between the server cluster 220A and other devices via communication link 228A to network 108. Cluster routers 224B and 224C may include network equipment similar to cluster routers 224A, and cluster routers 224B and 224C may perform networking functions for server clusters 220B and 220C that cluster routers 224A perform for server cluster 220A.

Additionally, the configuration of cluster routers 224A, 224B, and 224C can be based at least in part on the data communication requirements of the server devices and cluster storage arrays, the data communications capabilities of the network equipment in the cluster routers 224A, 224B, and 224C, the latency and throughput of the local cluster networks 226A, 226B, 226C, the latency, throughput, and cost of the wide area network connections 228A, 228B, and 228C, and/or other factors that may contribute to the cost, speed, fault-tolerance, resiliency, efficiency and/or other design goals of the system architecture.

D. Client Device

Figure 3:
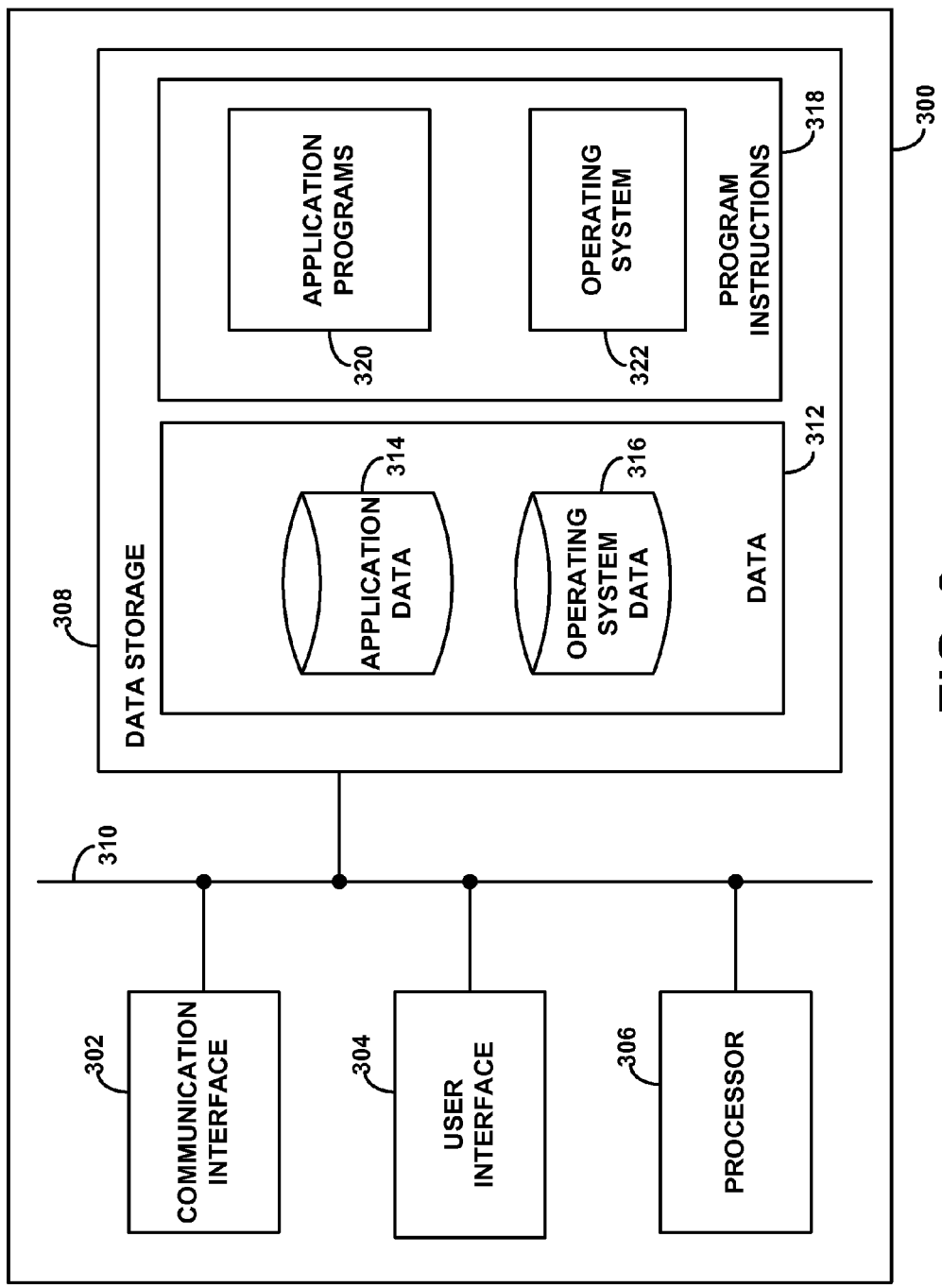
FIG. 3 depicts a block diagram of a client device, in accordance with an example embodiment.

FIG. 3 is a simplified block diagram showing some of the components of an example client device 300. By way of example and without limitation, client device 300 may be a "plain old telephone system" (POTS) telephone, a cellular mobile telephone, a still camera, a video camera, a fax machine, an answering machine, a computer (such as a desktop, notebook, or tablet computer), a personal digital assistant (PDA), a home automation component, a digital video recorder (DVR), a digital TV, a remote control, or some other type of device equipped with one or more wireless or wired communication interfaces.

As shown in FIG. 3, client device 300 may include a communication interface 302, a user interface 304, a processor 306, and data storage 308, all of which may be communicatively linked together by a system bus, network, or other connection mechanism 310.

Communication interface 302 functions to allow client device 300 to communicate, using analog or digital modulation, with other devices, access networks, and/or transport networks. Thus, communication interface 302 may facilitate circuit-switched and/or packet-switched communication, such as POTS communication and/or IP or other packetized communication. For instance, communication interface 302 may include a chipset and antenna arranged for wireless communication with a radio access network or an access point. Also, communication interface 302 may take the form of a wireline interface, such as an Ethernet, Token Ring, or USB port. Communication interface 302 may also take the form of a wireless interface, such as a Wifi, BLUETOOTH®, global positioning system (GPS), or wide-area wireless interface (e.g., WiMAX or LTE). However, other forms of physical layer interfaces and other types of standard or proprietary communication protocols may be used over communication interface 302. Furthermore, communication interface 302 may comprise multiple physical communication interfaces (e.g., a Wifi interface, a BLUETOOTH® interface, and a wide-area wireless interface).

User interface 304 may function to allow client device 300 to interact with a human or non-human user, such as to receive input from a user and to provide output to the user. Thus, user interface 304 may include input components such as a keypad, keyboard, touch-sensitive or presence-sensitive panel, computer mouse, trackball, joystick, microphone, still camera and/or video camera. User interface 304 may also include one or more output components such as a display screen (which, for example, may be combined with a presence-sensitive panel), CRT, LCD, LED, a display using DLP technology, printer, light bulb, and/or other similar devices, now known or later developed. User interface 304 may also be configured to generate audible output(s), via a speaker, speaker jack, audio output port, audio output device, earphones, and/or other similar devices, now known or later developed. In some embodiments, user interface 304 may include software, circuitry, or another form of logic that can transmit data to and/or receive data from external user input/output devices. Additionally or alternatively, client device 300 may support remote access from another device, via communication interface 302 or via another physical interface (not shown).

Processor 306 may comprise one or more general purpose processors (e.g., microprocessors) and/or one or more special purpose processors (e.g., DSPs, GPUs, FPUs, network processors, or ASICs). Data storage 308 may include one or more volatile and/or non-volatile storage components, such as magnetic, optical, flash, or organic storage, and may be integrated in whole or in part with processor 306. Data storage 308 may include removable and/or non-removable components.

Generally speaking, processor 306 may be capable of executing program instructions 318 (e.g., compiled or non-compiled program logic and/or machine code) stored in data storage 308 to carry out the various functions described herein. Therefore, data storage 308 may include a non-transitory computer-readable medium, having stored thereon program instructions that, upon execution by client device 300, cause client device 300 to carry out any of the methods, processes, or functions disclosed in this specification and/or the accompanying drawings. The execution of program instructions 318 by processor 306 may result in processor 306 using data 312.

By way of example, program instructions 318 may include an operating system 322 (e.g., an operating system kernel, device driver(s), and/or other modules) and one or more application programs 320 (e.g., address book, email, web browsing, social networking, and/or gaming applications) installed on client device 300. Similarly, data 312 may include operating system data 316 and application data 314. Operating system data 316 may be accessible primarily to operating system 322, and application data 314 may be accessible primarily to one or more of application programs 320. Application data 314 may be arranged in a file system that is visible to or hidden from a user of client device 300.

Application programs 320 may communicate with operating system 322 through one or more application programming interfaces (APIs). These APIs may facilitate, for instance, application programs 320 reading and/or writing application data 314, transmitting or receiving information via communication interface 302, receiving or displaying information on user interface 304, and so on.

In some vernaculars, application programs 320 may be referred to as "apps" for short. Additionally, application programs 320 may be downloadable to client device 300 through one or more online application stores or application markets. However, application programs can also be installed on client device 300 in other ways, such as via a web browser or through a physical interface (e.g., a USB port) on client device 300.

3. Example Automatic Speech Recognition System Training

Before describing language model training in detail, it may be beneficial to understand overall ASR system training and operation. Thus, this section describes ASR systems in general, including how the language model can interact with other logical components of an ASR system in order to facilitate speech recognition.

Figure 4:
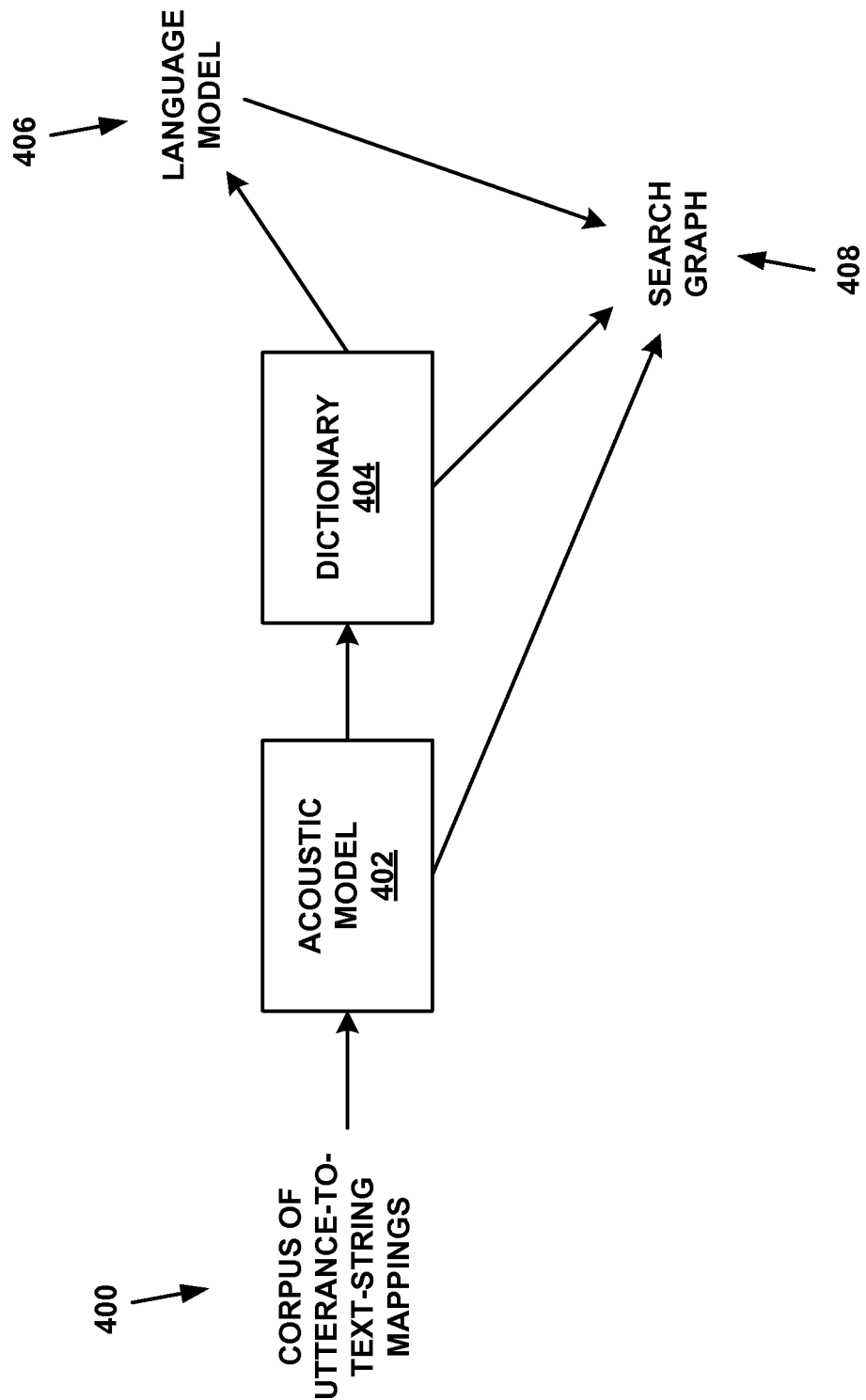
FIG. 4 depicts training an ASR system, in accordance with an example embodiment.

FIG. 4 depicts a representation of how an ASR system may be trained. The input to ASR system training may be a corpus of utterance-to-text-string mappings 400. These mappings may include utterances of human speech each associated with at least one transcription of a text string representation of the respective utterance. In some embodiments, these transcriptions may be high-accuracy manual and/or automatic transcriptions.

It should be noted that the discussion in this section, and the accompanying figures, are presented for purposes of example. Other methods of training an ASR system, including different modules, different configurations of modules, and/or different training steps, may be possible.

A. Acoustic Model

A phoneme may be considered to be the smallest segment of an utterance that encompasses a meaningful contrast with other segments of utterances. Thus, a word typically includes one or more phonemes. For purposes of simplicity, phonemes may be thought of as utterances of letters, but this is not a perfect analogy, as some phonemes may present multiple letters. An example phonemic spelling for the American English pronunciation of the word "cat" is "kaet," consisting of the phonemes "k," "ae," and "t." Another example phonemic spelling is "d aw g," consisting of the phonemes "d," "aw," and "g."

Different phonemic alphabets exist, and these alphabets may have different textual representations for the various phonemes therein. For example, the letter "a" may be represented by the phoneme "ae" when used to make the "a" sound in "cat," by the phoneme "ey" when used to make the "a" sound in "ate," and by the phoneme "ah" when used to make the "a" sound in "beta." Other phonemic representations are possible.

Common phonemic alphabets for American English contain about 40 distinct phonemes. Each of these phonemes may be associated with a different set of nominal output vector values. Thus, acoustic model 402 may be able to estimate the phoneme(s) in a sample utterance by analyzing the sample in the time and/or frequency domains, and finding the phoneme with nominal output vector values (e.g., frequency characteristics) that best match the output vector values of the sample. Or, put another way, acoustic model 402 can be used to provide scores every s milliseconds that describe how well the current sound in an utterance matches some or all possible phonemic sounds.

Figure 5:
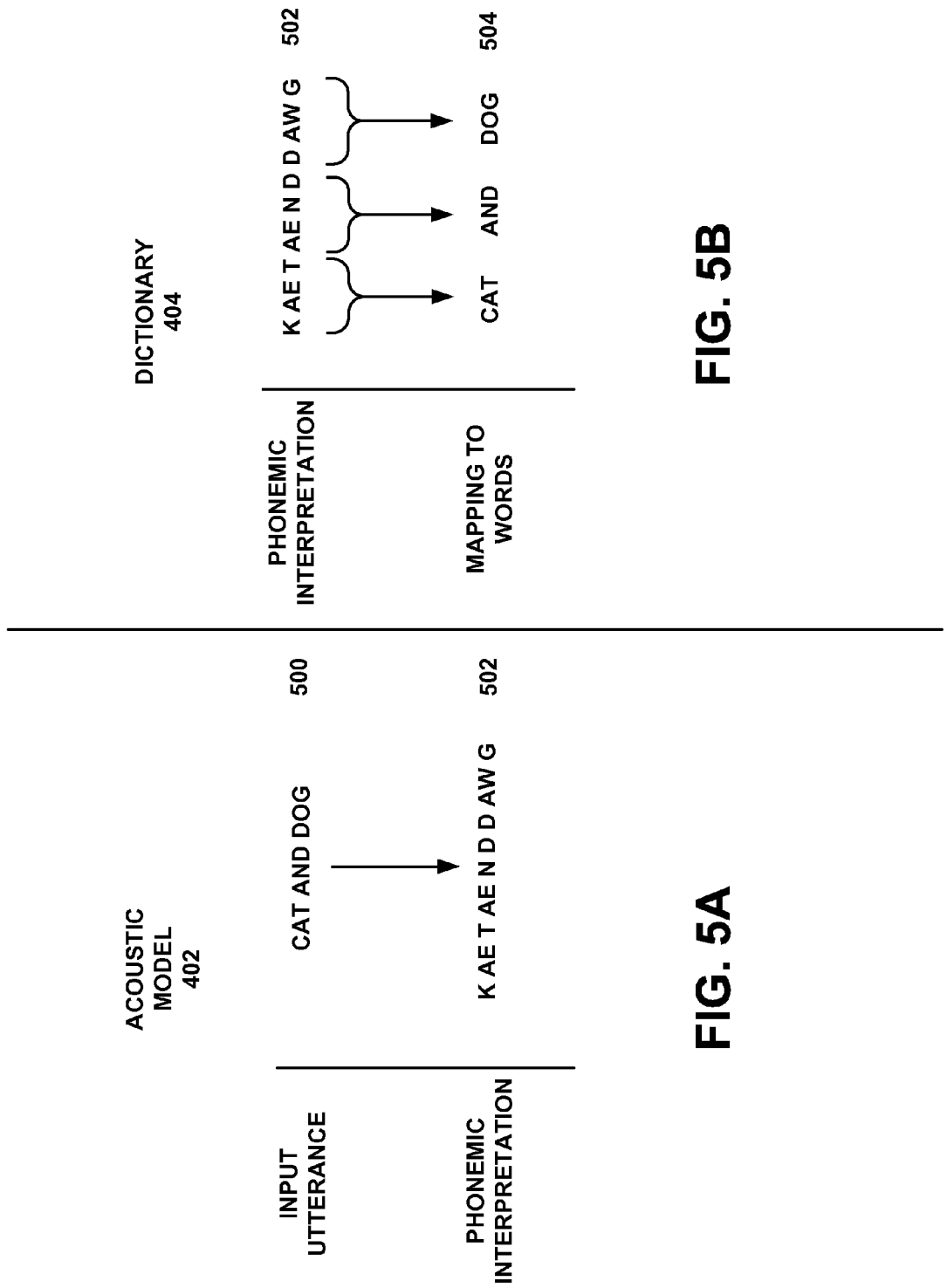
FIG. 5A depicts an aspect of ASR system acoustic model processing, in accordance with an example embodiment.
FIG. 5B depicts an aspect of ASR system dictionary processing, in accordance with an example embodiment.

This process is illustrated in FIG. 5A. For the input utterance "cat and dog" 500, acoustic model 402 may phonemically interpret this utterance as "k ae t ae n d d aw g" 502.

FIG. 5A assumes that the input utterance is clean and that acoustic model 402 is well-trained. In some environments, the input utterance may be distorted by background noise, clipping, or some other form of interference. Also, for some input utterances, particularly those with uncommon words or words spoken with an unknown accent, acoustic model 402 may incorrectly evaluate the input utterance.

One way of implementing an acoustic model, such as acoustic model 402, is by using a hidden Markov model (HMM). Some HMM-based acoustic models may also consider context when performing this mapping. For example, acoustic model 402 may consider the phoneme that precedes the current sample to provide a better estimate of the phoneme represented by the current sample. The use of context in this fashion can account for certain phoneme combinations (e.g., "aet") being more common than other phoneme combinations (e.g., "tk"). But, HMMs are just one technology that can be employed to develop an acoustic model, and acoustic model 402 can be based on technology other than HMMs.

Furthermore, acoustic model 402 may operate based on syllables or a segment of language other than context-dependent phonemic sounds. For instance, acoustic model 402 may interpret a series of phonemes as syllables, or as one or more words. For purposes of simplicity, throughout this specification and the accompanying drawings, it is assumed that acoustic models represent one or more phonemes as context-dependent phonemic sounds. However, acoustic models that use other types of representations are within the scope of the embodiments herein.

B. Dictionary

Once one or more phonemes are interpreted from an input utterance, dictionary 404 may be used to determine a pre-established mapping (e.g., from a list of tens or hundreds of thousands of phoneme pattern to word mappings) of these phonemes into words. This process is illustrated by FIG. 5B. For the input phonemic interpretation "k ae t ae n d d aw g" 502, dictionary 404 provides a mapping to the text string "cat and dog."

TABLE 1

| Word | Phonemic Interpretation |
|---|---|
| cat | k ae t |
| and | ay n d |
| dog | d aw g |

In some embodiments, dictionary 404 may include a lookup table, such as Table 1. Table 1 illustrates how dictionary 404 may list the phonemic sequences that search graph 408 uses for the words that the ASR system is attempting to recognize.

C. Language Model

Turning back to FIG. 4, one output of the ASR system training process may be language model 406. Language model 406 may define the conditional probability of $w_n$ (the nth word in a phrase transcribed from an utterance), given the values of the pattern of n−1 previous words in the phrase. More formally, language model 406 may define $$P(w_{n|w1}, w_2, \ldots, w_{n-1})$$

In general, a language model may operate on n-grams, which, for example, may be sequences of n words that were recognized from the utterances in corpus 400, via acoustic model 402 and dictionary 404. Alternatively or additionally, the n-grams may be derived from a corpus of phrases and sentences written in a target language.

In some embodiments, a language model may operate on a sequence of n phonemes, syllables, words, or series of words. In practice, language models with values of n greater than 5 are rarely used because of their computational complexity, and also because smaller n-grams (e.g., 3-grams, which are also referred to as tri-grams) tend to yield acceptable results. In the example described below, tri-grams are used for purposes of illustration. Nonetheless, any value of n may be may be used with the embodiments herein.

Thus, through analysis of the corpus 400, tri-gram probabilities can be estimated based on their respective number of appearances in the training corpus. In other words, if $C(w_1, w_2, w_3)$ is the number of occurrences of the word pattern $w_1, w_2, w_3$ in corpus 400, then $$P(w_3 \mid w_1, w_2) \approx \frac{C(w_1, w_2, w_3)}{C(w_1, w_2)}$$

Thus, a language model may be represented as a table of conditional probabilities. Table 2 illustrates a simple example of such a table that could form the basis of language model 406. Particularly, Table 2 contains tri-gram conditional probabilities.

TABLE 2

| Tri-gram Conditional Probabilities |
|---|
| P(dog|cat,and) = 0.5 |
| P(mouse|cat,and) = 0.35 |
| P(bird|cat,and) = 0.14 |
| P(fiddle|cat,and) = 0.01 |

For the 2-gram prefix "cat and," Table 2 indicates that, based on the observed occurrences in corpus 400, 50% of the time the next 1-gram is "dog." Likewise, 35% of the time, the next 1-gram is "mouse," 14% of the time the next 1-gram is "bird," and 1% of the time the next 1-gram is "fiddle." Clearly, in a fully-trained ASR system, the language model would contain many more entries, and these entries would include more than just one 2-gram prefix.

Nonetheless, using the observed frequencies of word patterns from a corpus of speech (and/or from other sources) is not perfect, as some acceptable tri-grams may not appear in the training corpus, and may therefore be assigned a probability of zero. Consequently, when given a zero-probability tri-gram at run time, the language model may instead attempt to map this tri-gram to a different tri-gram associated with a non-zero probability.

In order to reduce this likelihood, the language model may be smoothed so that zero-probability tri-grams have small non-zero probabilities, and the probabilities of the tri-grams in the training corpus are reduced accordingly. In this way, tri-grams not found in the training corpus can still be recognized by the language model.

D. Search Graph

Another possible output from the ASR training process illustrated in FIG. 4 is a search graph, such as search graph 408. A search graph may be a data structure that represents the totality (or a large part of) the speech patterns of an input corpus, and may serve to enable rapid recognition of new input utterances in an operational ASR system. Thus, search graph 408 may be based on output from acoustic model 402, dictionary 404, and language model 406.

Figure 6:
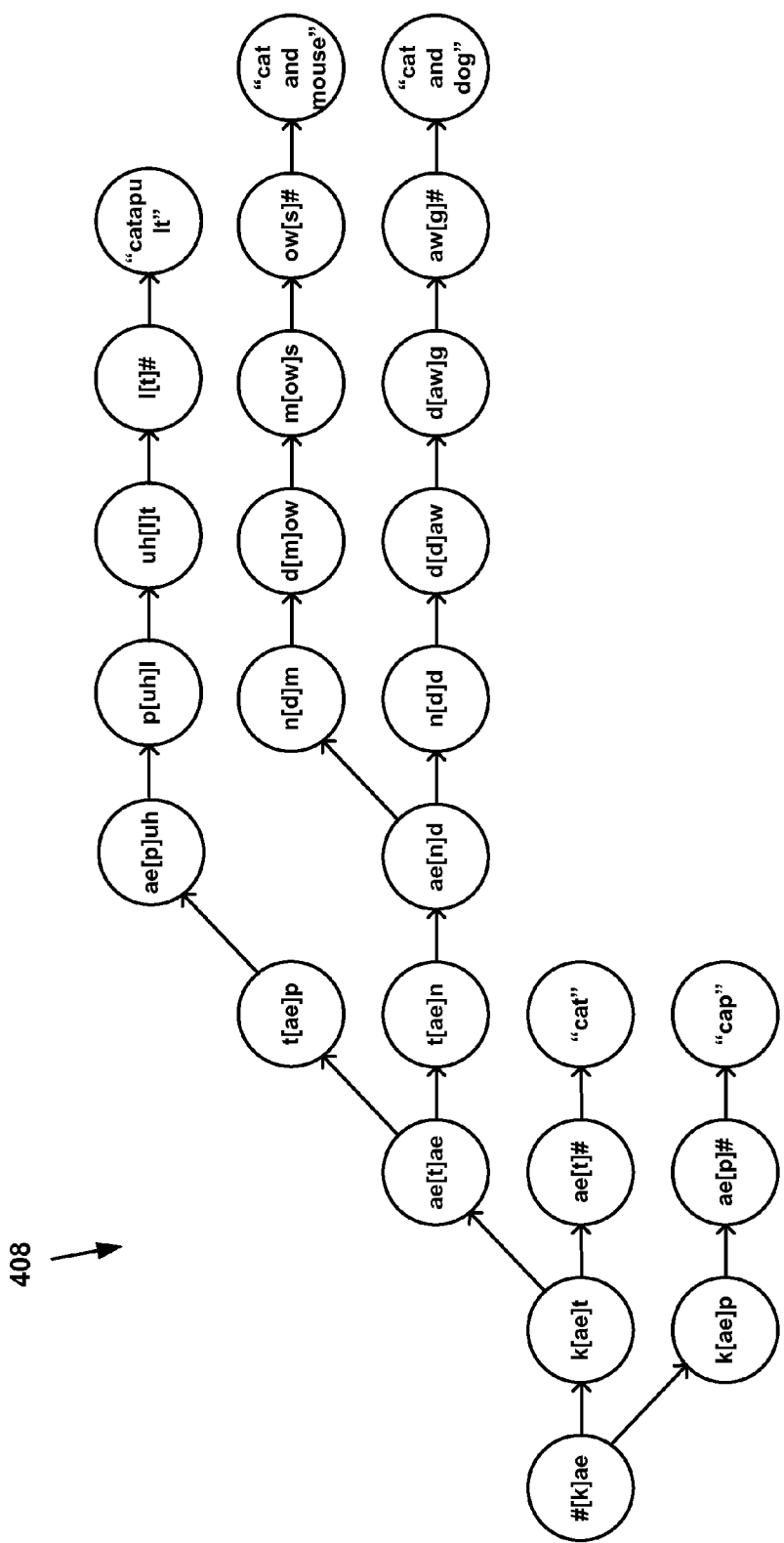
FIG. 6 depicts an ASR system search graph, in accordance with an example embodiment.

FIG. 6 illustrates a possible embodiment of search graph 408. In order to be illustrative, search graph 408 is much smaller and less complex than a search graph that would be used in an actual ASR system.

Particularly, search graph 408 was trained with only the five input utterances, "catapult," "cat and mouse," "cat and dog," "cat," and "cap."

Each circle in search graph 408 may represent a state associated with the processing of an input utterance that has been mapped to phonemes. These states are named based on the current phoneme context of the input utterance, using the format "x[y]z" to indicate that the current phoneme being considered, y, has a left-context of the phoneme x and a right context of the phoneme z. In other words, the state "x[y]z" indicates a point in processing an utterance in which the current phoneme being considered is y, the previously phoneme in the utterance is x, and the next phoneme in the utterance is z. The beginning of an utterance and the end of an utterance are represented by the "#" character, and also may be referred to as null phonemes.

Terminal states may be represented by a recognized word or phrase in quotes. Search graph 408 includes five terminal states, representing recognition of the words or phrases "catapult," "cat and mouse," "cat and dog," "cat," and "cap."

Transitions from one state to another may represent an observed ordering of phonemes in the corpus. For instance, the state "#[k]ae" represents the recognition of a "k" phoneme with a left context of a null phoneme and a right context of an "ae" phoneme. There are two transitions from the state "#[k]ae"—one for which the next phoneme (the phoneme after the "ae") is a "t" and another for which the next phoneme is a "p."

Based on acoustic model 402, dictionary 404, and language model 406, costs may be assigned to one or more of the states and/or transitions. For example, if a particular phoneme pattern is rare, a transition to a state representing that phoneme pattern may have a higher cost than a transition to a state representing a more common phoneme pattern. Similarly, the conditional probabilities from the language model (see Table 2 for examples) may also be used to assign costs to states and/or transitions. For instance, in Table 2, given a phrase with the words "cat and," the conditional probability of the next word in the phrase being "dog" is 0.5, while the conditional probability of the next word in the phrase being "mouse" is 0.35. Therefore, the transition from state "ae[n]d" to state "n[d]m" may have a higher cost than the transition from state "ae[n]d" to state "n[d]d."

Once an ASR system is trained, search graph 408, possibly including any states, transitions between states, and associated costs therein, may be used to estimate text string transcriptions for new input utterances. The next section describes ASR system operation in more detail.

4. Example Automatic Speech Recognition System Operation

Figure 7:
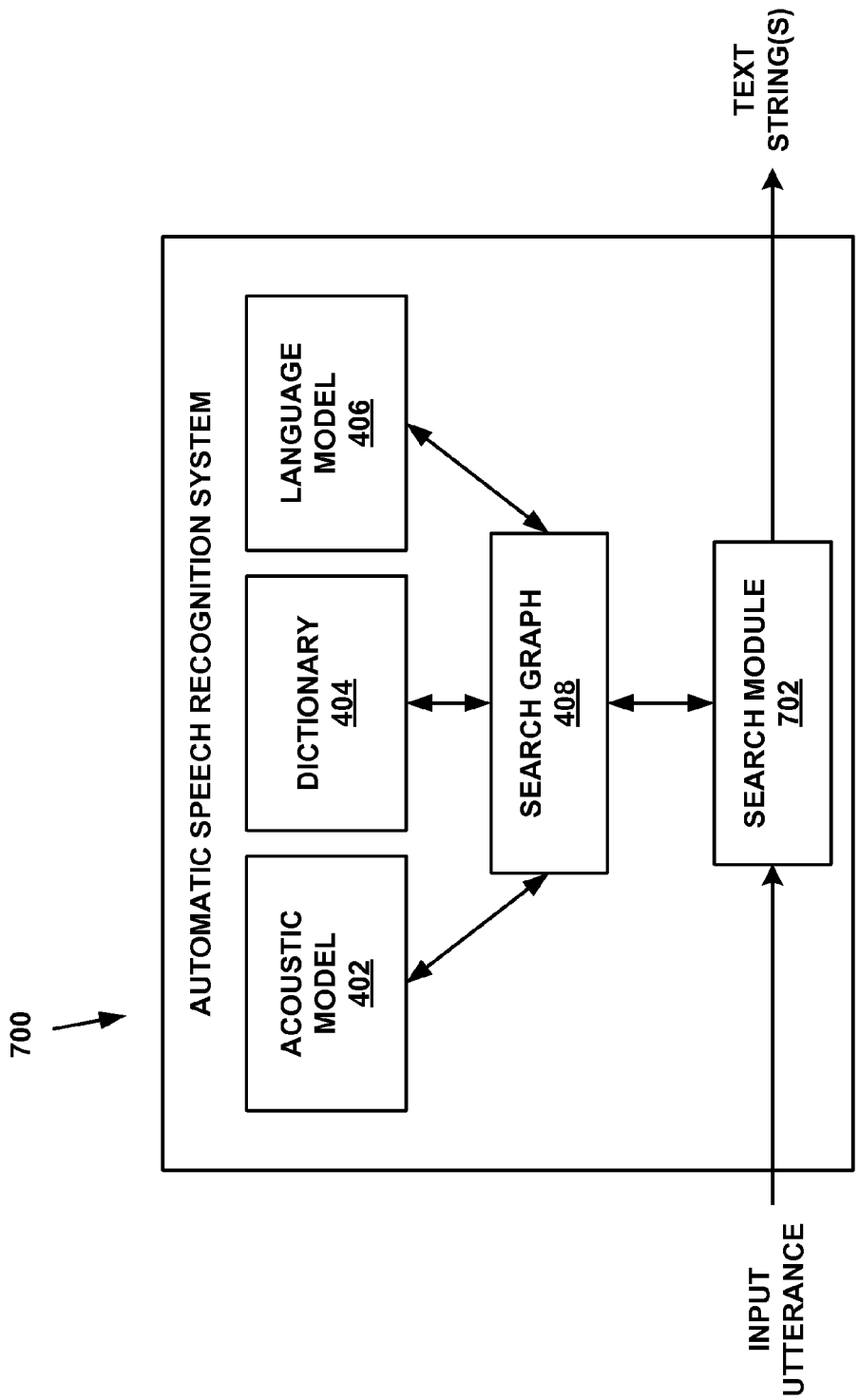
FIG. 7 depicts operating an ASR system, in accordance with an example embodiment.

An illustrative model of an operational ASR system is shown in FIG. 7. Example ASR system 700 may include representations of acoustic model 402, dictionary 404, language model 406, and search graph 408. Alternatively, ASR system 700 may omit one or more of these modules. For example, characteristics of dictionary 404 and language model 406 may be incorporated into the structure of search graph 408, and therefore may not be necessary in ASR system 700.

Input to ASR system 700 may be an input utterance, such as a word, a phrase, a sentence, or a series of sentences. The input utterance may take the form of an analog or digital audio signal. Output from ASR system 700 may be one or more text strings that the ASR system has transcribed based on the input utterance. While ASR system 700 may seek to produce accurate text string transcriptions of input utterances, this may not always be possible. Thus, for some input utterances, ASR system 700 may produce more than one possible text string transcription that could match the input utterance. For instance, ASR system 700 may estimate the N-best transcriptions of an input utterance, and output one or more of these transcriptions.

Additionally, FIG. 7 shows search module 702 being coupled with search graph 408, and search graph 408 being coupled with acoustic model 402, dictionary 404, and language model 406. However, other arrangements are possible. For instance, search module 702 may interact directly with acoustic model 402 and/or dictionary 404.

Search module 702 may be used to determine a sequence of one or more words that matches an input utterance. Formally, search module 702 may attempt to find $$w^* = \arg\max_w P(\alpha|w)P(w)$$

where $\alpha$ is a stream of feature vectors derived from the input utterance, $P(\alpha|w)$ represents the probability of those feature vectors being produced by a word sequence w, and $P(w)$ is the probability assigned to w by language model 406. For example, $P(w)$ may be based on n-gram conditional probabilities as discussed above, as well as other factors. The function argmax, may return the value of w that maximizes $P(\alpha|w)P(w)$.

Particularly, as part of the process of transcribing the input utterance to one or more text strings, search module 702 may apply acoustic model 402 to the input utterance. The result of this step may be a sequence of phonemes. Then, the sequence may serve as input to search graph 408. In some embodiments, search module 702 may attempt to find paths from an initial state in search graph 408 to a terminal state in search graph 408 based on this sequence. This process may involve search module 702 performing a breadth-first search, depth-first search, beam search, or some other type of search. Search module 702 may assign a total cost to one or more paths based on costs associated with the states and/or transitions of each path. Some of these costs may reflect, for instance, a confidence level that a particular segment of the utterance maps to a particular phoneme context in the path.

As an example, suppose that the input utterance is the phrase "cat and dog." Referring back to FIG. 6, in a possible scenario, search module 702 would step through search graph 408 phoneme by phoneme and find the path beginning with initial state "#[k]ae" and ending with terminal state "cat and dog." Search module 702 may also find one or more additional paths through search graph 408. For example, search module 702 may also associate the input utterance with the path with initial state "#[k]ae" and ending with terminal state "cat and mouse," and with the path with initial state "#[k]ae" and ending with terminal state "catapult." Nonetheless, search module 702 may assign a lower cost to the path with terminal state "cat and dog" than to each of the other paths. Consequently, the path with terminal state "cat and dog" may be selected as the "best" transcription for the input utterance.

It should be understood that ASR systems can operated in many different ways. The embodiments described above are presented for purposes of illustration and may not be the only way in which an ASR system operates.

Figure 8A:
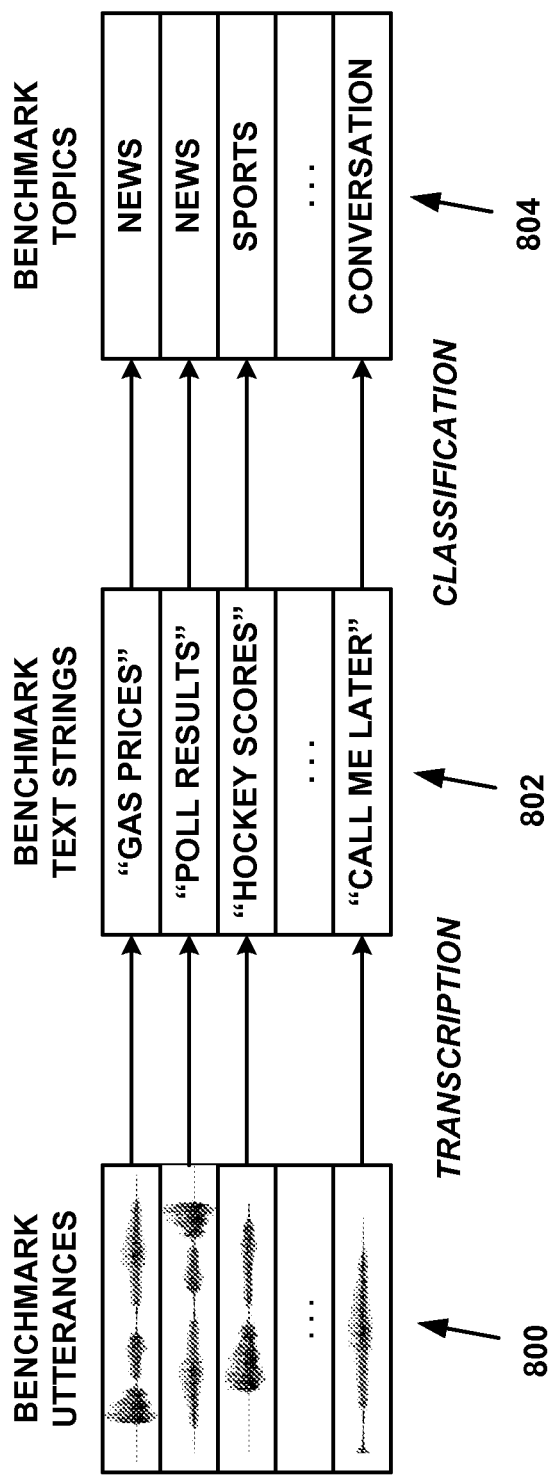
FIG. 8A depicts determining a benchmark topic distribution of benchmark text strings, in accordance with an example embodiment.

5. Sampling Training Data for Automatic Speech Recognition Based on a Benchmark Classification Distribution As noted in Section 1, training data for a language model may be developed by sampling a large corpus of text strings according to a benchmark classification distribution. In order to do so, the benchmark classification distribution may first be obtained. FIG. 8A depicts an example embodiment that derives a benchmark topic distribution of a set of benchmark text strings.

Benchmark utterances 800 may be digital encodings of human voice. In some cases, a benchmark utterance may be a small number of words from an uttered phrase or sentence. In other cases, a benchmark utterance may be a larger number of words from one or more uttered phrases or sentences. Thus, benchmark utterances 800 may include utterances made by users of voice recognition applications (e.g., voice search, voice maps, and/or voice instant messaging). Alternatively or additionally, benchmark utterances 800 may include utterances from broadcast news, sporting events, speeches, and so on. It should be understood that benchmarks utterances can be gathered from any source, and may be gathered from multiple sources.

Benchmark utterances 800 may be of a particular language domain in order to train an ASR system to perform effectively on utterances from that language domain. Thus, benchmark utterances 800 could be entirely or primarily from a particular source, from a particular user or users, in a particular dialect, etc. In some embodiments, benchmark utterances may consist of a relatively small set of utterances, perhaps no more than 30 minutes total. However, larger or smaller sets of benchmark utterances may be used.

Benchmark utterances 800 may be transcribed to produce benchmark text strings 802. This transcription process may be automated (e.g., performed by a computing device), manual (e.g., performed by a human), or some combination thereof. In some cases, the transcription may be performed by a non-real-time ASR system. One advantage of using a non-real-time ASR system is that it can dedicate more time than a real-time ASR system to, e.g., evaluating phonemes and/or exploring various paths of its search graph. (For example, a non-real-time ASR system may utilize a multi-decoding pass system to perform lattice rescoring.) As a result, a non-real-time ASR system may produce a high-quality transcription of input utterances.

Once one or more of benchmark text strings 802 are transcribed, these text strings may be classified. Various techniques of text string classification may be used. For instance, the classifier may search each text string for keywords that are indicative of certain topics. Upon finding one or more of the keyword(s) associated with a particular topic, the classifier may indicate that the text string contains text related to that topic.

Examples of classification are shown in benchmark topics 804. The text strings "gas prices" and "poll results" are both classified as "news," while the text string "hockey scores" is classified as "sports" and the text string "call me later" is classified as "conversation." Nonetheless, there may be different ways of performing text string classification. For instance, there may be tens, hundreds, or thousands of topics. Thus, in some scenarios, the topic "news" could be subdivided into additional subtopics, such that the text string "gas prices" is classified as "economics" and the text string "poll results" is classified as "politics."

Alternatively or additionally, the benchmark text strings may be classified in other ways, such as based on speech style or dialect. Thus, in some embodiments, the classifier may classify all text strings into one of two speech style categories, formal or spontaneous. For instance, text strings derived from broadcast news recordings might be classified as formal speech, while text strings derived from voice instant messaging or voice search might be classified as spontaneous speech. Of course, more than just two categories of speech style may be used.

Similarly, in other embodiments, the classifier may classify all text strings into one or more dialects. It should be noted that, in general, a dialect refers to a vocabulary, grammar, and/or pronunciation of a language that is particular to a group of speakers. Thus, a dialect may be specific to a geographic region, a social class, and/or cultural class. For example, a speaker who is native to New York City may speak a notably different dialect of American English than a speaker who is native to Texas.

Throughout the rest of this specification and its accompanying drawings, text string classification will be shown by topic, for purposes of illustration. However, it should be understood that text strings can be classified based any one or more of topic, style, dialect, or other types of categories now known or developed in the future.

Once benchmark topics 804 are determined, a benchmark topic distribution can be obtained. This distribution may represent the relative likelihood that each benchmark topic is the result of a classification of a benchmark text string. Thus, the benchmark topic distribution for benchmark text strings 802 is 50% news, 25% sports, and 25% conversation. One way in which a benchmark topic distribution can be determined is to count the number of times each particular benchmark topic occurs in benchmark topics 804, and divide the result by the total number of text strings in benchmark text strings 802.

In at least some embodiments, the benchmark topic distribution may represent the distribution of topics that occur in benchmark utterances 800, and thus provide a reasonable estimate of the topic distribution in the target language domain for which the ASR system is expected to be used. Since the number of utterances in benchmark utterances 800 may be too small to effectively train an ASR system, it may be beneficial to sample a much larger corpus of text strings to derive training data from the ASR system. This much larger corpus may be sampled such that the resulting training data exhibits a topic distribution that is roughly equivalent to the benchmark topic distribution. This resulting training data is likely to be able to train the ASR system to perform effectively in the target language domain.

Figure 8B:
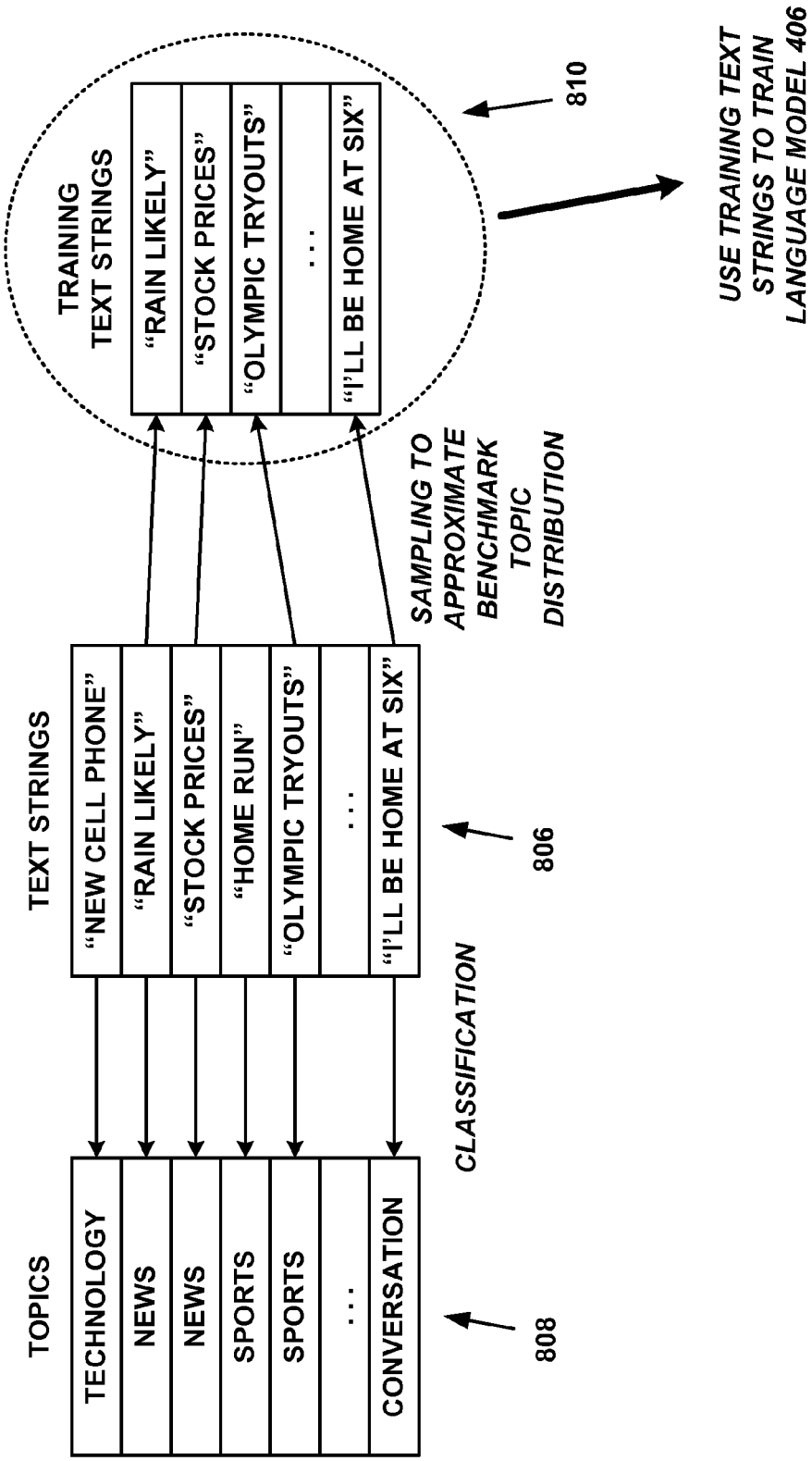
FIG. 8B depicts sampling a corpus of text strings such that the topic distribution of the sampled text string approximates that of the benchmark text strings, in accordance with an example embodiment.

FIG. 8B depicts a corpus of text strings 806. The text strings in this corpus may have been collected from virtually any source. For example, text strings 806 may be from documents found on the WWW (e.g., web pages, word processing documents, technical papers, books, etc.). Alternatively or additionally, text strings 806 may be transcriptions of utterances submitted to an ASR system, or from other sources. In some scenarios, text strings 806 may contain millions or billions of text strings.

Text strings 806 may be classified into topics 808. The classifier used to perform this classification may be the same as, or similar to, the classifier used to classify benchmark text strings 802 into benchmark topics 804. Once at least some of topics 808 are known, text strings 806 can be sampled to form training text strings 810. As noted above, this sampling may be conducted such that the topic distribution of training text strings 810 matches the benchmark topic distribution. Thus, as shown in FIG. 8B, 50% of training text strings 810 were classified as news, 25% as sports, and 25% as conversation.

One way in which the topic distribution of training text strings 810 can be made to match the benchmark topic distribution is to sample text strings 806 according to the following method. Assume that there are c text strings in text strings 806 and a goal is to have t text strings in training text strings 810. In some embodiments, t may be smaller than c.

Assume further that $B(i)$ is the representation of topic i in the benchmark topic distribution, where $\Sigma_i B(i)=1$. For example, in the benchmark topic distribution discussed above, B ("news")=½, B ("sports")=¼, and B("conversation")=¼. Also, assume that $N(i)$ is the number of text strings classified with topic i in text strings 806. Then, each text string in text strings 806 may be sampled according to the probability given by $$S(i) = \frac{t \times B(i)}{N(i)}$$

As an example, suppose that $S(i)=\frac{1}{16}$. Then, each text string of topic i may be selected as a training string with a probability of ⅟₁₆. The sampling process may also address boundary conditions. Thus, for instance, if $N(i)=0$, $S(i)$ may be set to 0. Additionally, if $S(i)>1$, $S(i)$ may be set to 1. In this way, the resulting topic distribution of training text strings 810 is based on the benchmark topic distribution. Using this technique in practice, the topic distribution of training text strings 810 is likely to either match or approximate the benchmark topic distribution.

Nonetheless, the example provided above is merely for purposes of illustration. Text strings 806 may be sampled in other ways in order to obtain a training topic distribution of training text strings 810 that is based on the benchmark topic distribution.

Once training text strings 810 are determined, they may be used to train the language model of an ASR system. In some implementations, this may involve, in accordance with the discussion in Section 3C, calculating $$P(w_n | w_1 \ldots w_{n-1}) \approx \frac{T(w_1 \ldots w_n)}{T(w_1 \ldots w_{n-1})}$$

Where $T(w_1 \ldots w_n)$ is the number of occurrences of the word pattern $w_1 \ldots w_n$ in training text strings 810.

6. Example Operations

Figure 9:
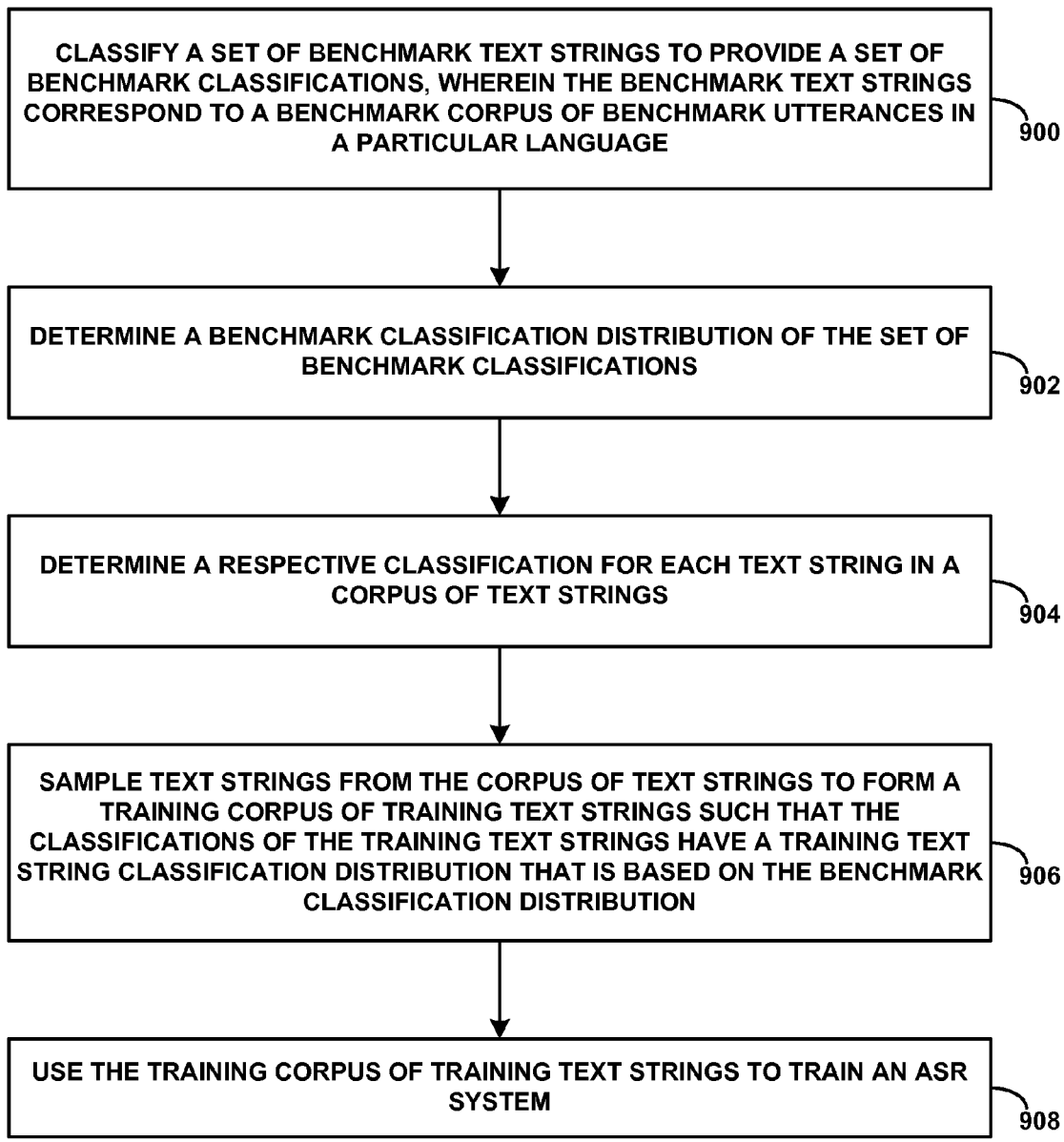
FIG. 9 is a flow chart, in accordance with an example embodiment.

FIG. 9 is a flow chart of an example embodiment. The steps illustrated by this flow chart may be carried out by one or more computing devices, such as server device 200 or server cluster 220A. Further, aspects of each individual step may be distributed between multiple computing devices.

At step 900, a set of benchmark text strings may be classified to provide a set of benchmark classifications. At step 902, a benchmark classification distribution of the set of benchmark classifications may be determined.

The benchmark text strings in the set may correspond to a benchmark corpus of benchmark utterances in a particular language, and each benchmark text string in the set of benchmark text strings may have been transcribed from a respective benchmark utterance in the benchmark corpus of benchmark utterances. The set of benchmark classifications may include topic classifications, speaking style classifications, dialect classifications, or some other type of classification.

Further, the benchmark utterances may have been made by users in a category of users, and the ASR system may be configured to transcribe new utterances made by these users. For instance, the benchmark utterances may have been made by a single user, by users with a particular dialect, and/or by users from a particular geographic location.

At step 904, a respective classification for each text string in a corpus of text strings may be determined. Each text string in the corpus of text strings may have been transcribed from a respective utterance from an associated corpus of utterances, or may have been derived from some other source.

At step 906, text strings from the corpus of text strings may be sampled to form a training corpus of training text strings such that the classifications of the training text strings have a training text string classification distribution that is based on the benchmark classification distribution. For example, the training text string classification distribution may be substantially similar to the benchmark classification distribution. In other words, the training text string classification distribution may differ to some extent from the benchmark classification distribution, but should still reflect at least some statistical properties of the benchmark classification distribution.

In some embodiments, there may be fewer benchmark text strings in the benchmark corpus than training text strings in the training corpus. For example, there may be a few hundred benchmark text strings, but millions (or more) training text strings.

At step 908, the training corpus of training text strings may be used to train an ASR system. The training may involve training a language model of the ASR system with a combination of the training corpus of training text strings and an additional corpus of text strings that were transcribed from utterances made by users of the ASR system.

7. Conclusion

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

For situations in which the systems discussed here collect personal information about users, the users may be provided with an opportunity to opt in/out of programs or features that may collect personal information (e.g., information about a user's preferences or a user's utterances made to an ASR system). In addition, certain data may be anonymized in one or more ways before it is stored or used, so that personally identifiable information is removed. For example, a user's identity may be anonymized so that the no personally identifiable information can be determined for the user and so that any identified user preferences or user interactions are generalized (for example, generalized based on user demographics) rather than associated with a particular user.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:

obtaining a benchmark classification distribution of topic classifications for benchmark text strings;

selecting, by a computing device, training text strings from a corpus of text strings, wherein the training text strings are associated with respective topic classifications, and wherein selecting the training text strings includes (a) determining to select t training text strings, (b) determining that a frequency of topic i in the benchmark classification distribution is B(i), wherein B(i) is inclusively between 0 and 1, (c) determining that a number of text strings classified with topic i in the corpus of text strings is N(i), and (d) selecting a training text string of topic i from the corpus of text strings based on probability $t \times B(i)/N(i)$; and training a language model of an automatic speech recognition (ASR) system using the training text strings.

2. The method of claim 1, wherein obtaining the benchmark classification distribution comprises:
   transcribing benchmark utterances to respective benchmark text strings; and
   determining the benchmark classification distribution from the benchmark text strings.

3. The method of claim 2, wherein the benchmark utterances were made by users in a category of users, and wherein the ASR system is configured to transcribe new utterances made by users in the category of users.

4. The method of claim 3, wherein the benchmark utterances were made by a single user, and wherein the ASR system is configured to transcribe new utterances made by the single user.

5. The method of claim 3, wherein the benchmark utterances were made by users with a particular dialect, and wherein the ASR system is configured to transcribe new utterances made by users with the particular dialect.

6. The method of claim 3, wherein the benchmark utterances were made by users from a particular geographic location, and wherein the ASR system is configured to transcribe new utterances made by users from the particular geographic location.

7. The method of claim 1, wherein there are fewer benchmark text strings than training text strings.

8. The method of claim 1, wherein the training text strings were transcribed from respective utterances.

9. The method of claim 1, wherein the topic classifications of the training text strings have a training text string classification distribution, and wherein the training text strings are selected such that the training text string classification distribution is substantially similar to the benchmark classification distribution.

10. The method of claim 1, wherein training the language model of the ASR system comprises:
   training the language model of the ASR system with a combination the training text strings and an additional corpus of text strings that were transcribed from utterances made by users of the ASR system.

11. An article of manufacture including a non-transitory computer-readable medium, having stored thereon program instructions that, upon execution by a computing device, cause the computing device to perform operations comprising:
   obtaining a benchmark classification distribution of topic classifications for benchmark text strings;
   selecting training text strings from a corpus of text strings, wherein the training text strings are associated with respective topic classifications, and wherein selecting the training text strings includes (a) determining to select t training text strings, (b) determining that a frequency of topic i in the benchmark classification distribution is $B(i)$, wherein $B(i)$ is inclusively between 0 and 1, (c) determining that a number of text strings classified with topic i in the corpus of text strings is $N(i)$, and (d) selecting a training text string of topic i from the corpus of text strings based on probability $t \times B(i)/N(i)$; and
   training a language model of an automatic speech recognition (ASR) system using the training text strings.

12. The article of manufacture of claim 11, wherein obtaining the benchmark classification distribution comprises:
   transcribing benchmark utterances to respective benchmark text strings; and
   determining the benchmark classification distribution from the benchmark text strings.

13. The article of manufacture of claim 11, wherein the topic classifications of the training text strings have a training text string classification distribution, and wherein the training text strings are selected such that the training text string classification distribution is substantially similar to the benchmark classification distribution.

14. The article of manufacture of claim 11, wherein training the language model of the ASR system comprises:
   training the language model of the ASR system with a combination the training text strings and an additional corpus of text strings that were transcribed from utterances made by users of the ASR system.

15. A computing system comprising:
   at least one processor;
   data storage; and
   program instructions in the data storage that, upon execution by the at least one processor, cause the computing system to perform operations comprising:
      obtaining a benchmark classification distribution of topic classifications for benchmark text strings;
      selecting training text strings from a corpus of text strings, wherein the training text strings are associated with respective topic classifications, and wherein selecting the training text strings includes (a) determining to select t training text strings, (b) determining that a frequency of topic i in the benchmark classification distribution is $B(i)$, wherein $B(i)$ is inclusively between 0 and 1, (c) determining that a number of text strings classified with topic i in the corpus of text strings is $N(i)$, and (d) selecting a training text string of topic i from the corpus of text strings based on probability $t \times B(i)/N(i)$; and
   training a language model of an automatic speech recognition (ASR) system using the training text strings.

16. The computing system of claim 15, wherein obtaining the benchmark classification distribution comprises:
   transcribing benchmark utterances to respective benchmark text strings; and
   determining the benchmark classification distribution from the benchmark text strings.

17. The computing system of claim 15, wherein the topic classifications of the training text strings have a training text string classification distribution, and wherein the training text strings are selected such that the training text string classification distribution is substantially similar to the benchmark classification distribution.

* * * * *